United States Patent [19]

Morishita et al.

[11] Patent Number: 4,961,781
[45] Date of Patent: Oct. 9, 1990

[54] HIGH CORROSION-AND WEAR RESISTANT-POWDER SINTERED ALLOY AND COMPOSITE PRODUCTS

[75] Inventors: Masao Morishita, Kobe; Hiroshi Kawatani, Kakogawa; Toshiyuki Minamide, Takasago, all of Japan

[73] Assignee: Kabushiki Kaisha Kobe Seiko Sho, Kobe, Japan

[21] Appl. No.: 249,995

[22] Filed: Sep. 27, 1988

[30] Foreign Application Priority Data

Sep. 30, 1987 [JP] Japan .................................. 62-246288
Nov. 30, 1987 [JP] Japan .................................. 62-302498
Dec. 24, 1987 [JP] Japan .................................. 62-328212
Mar. 24, 1988 [JP] Japan .................................. 63-070714

[51] Int. Cl.$^5$ ............................................. C22C 29/14
[52] U.S. Cl. .......................................... 75/244; 75/246; 428/552; 428/627; 419/12
[58] Field of Search ................. 75/244, 246; 419/12; 428/552, 627

[56] References Cited

U.S. PATENT DOCUMENTS

| | | | |
|---|---|---|---|
| 4,217,141 | 9/1980 | Schrittwieser | 75/244 |
| 4,400,213 | 9/1983 | Sheinberg | 75/238 |
| 4,427,446 | 1/1984 | Miura et al. | 75/244 |
| 4,729,789 | 3/1988 | Ide et al. | 75/244 |
| 4,761,344 | 9/1988 | Maki et al. | 428/552 |

*Primary Examiner*—Stephen J. Lechert, Jr.
*Assistant Examiner*—Nina Bhat
*Attorney, Agent, or Firm*—Oblon, Spivak, McClelland, Maier & Neustadt

[57] ABSTRACT

Wear resistant powder sintered alloy of excellent corrosion resistance comprising a hard alloy containing from 15 to 95% of a hard phase composed of a $M_3B_2$ phase (M represents Ni or Co, Cr, Mo or W) structure in the matrix, wherein the hard alloy contains, on the weight basis, 0.5-9.0% of B, 14.0-35.0% of Cr, 14.0-50.0% of one or more of Mo and W, up to 3.5% of Si, 0.5-20.0% of one or more of Cu, Ag, Au and Pt and the balance of one or more of Ni and Co and inevitable impurities, and the matrix has a noble corrosion potential.

The novel abrasion resistant sintered powdery alloy has excellent corrosion resistance to corrosive gases such as hydrogen, $SO_2$ and $NO_x$ which are often released from molding processes for plastics, rubbers, etc.

9 Claims, 1 Drawing Sheet

HIGH CORROSION-AND WEAR RESISTANT-POWDER SINTERED ALLOY AND COMPOSITE PRODUCTS

BACKGROUND OF THE INVENTION

1. Field of the Invention

The present invention concerns an wear resistant powder sintered alloy having corrosion resistant property, particularly, to halogen gases such as fluorine gas, SOx gas, NOx gas, etc. and suitable to application for molding apparatus of plastics, rubbers or ceramics that release these gases.

2. Description of the Prior Art

Since injection or extrusion molding of plastic materials are conducted at a rather high temperature conditions, heat decomposition can not be avoided for a portion the starting material used therefor and evolution of corrosive gases has been considered more or less inevitable. Particularly, in the case of blending halogen-containing compounds with an aim of providing flame retardancy, a great amount of halogen-containing gases are released. Then, the inside of the cylinder is always exposed to a corrosive circumstance and, accordingly, corrosion resistance at high level is required for the cylinder. Besides, since a considerably high pressure is loaded upon molding and the strength of inorganic fillers often blended in order to improve the strength is extremely high, high wear resistance is also required for the cylinder.

Particularly, materials of injection and extrusion molding machines for fluoro resins are required to have extremely high corrosion resistance capable of withstanding highly corrosive gases. Further, since corrosive gases are evolved also in the case of cutting and scraping those molding products made of fluoro resin and fluoro rubber, countermeasures for the corrosion and the wear are important.

In injection molding or extrusion molding of plastic materials such as synthetic plastics, for example, PES (polyether sulfone) or PPS (polyphenylene sulfide) resins or rubbers, heated plastic materials are charged in a cylinder and molded by applying pressure from a plunger. Since the molding operation is conducted at a rather high temperature condition and since $SO_2$ gases are evolved from sulfone groups in the plastic materials such as heated resins, it is necessary to use those materials excellent in corrosion resistance as well as wear resistance.

Furthermore, in the injection molding or extrusion molding of plastics such as ABS resins, since NOx is released from CN groups or corrosive gases such as halogen gases are evolved from heated plastic materials such as resins, those materials excellent in the corrosion resistance as well as the wear resistance have to be used.

Self-melting abrasion resistant Ni-based alloys and Co-based alloys have usually been used as the cylinder material of this type and they are utilized by lining to the inside of the cylinder by a centrifugal casting method.

In different form of application uses, Ni-MO-Cr alloys of excellent corrosion resistance are also used.

However, although the former self-fluxing wear resistant alloys are excellent in the wear resistance, corrosion resistance of them to corrosive gases is not sufficient and, particularly, the corrosion resistance to highly corrosive fluorine gas among halogen gases, $SO_2$ gas and NOx gas is extremely poor. On the other hand, although the latter Ni-Mo-Cr alloys are satisfactory in the corrosion resistance, they are poor in the wear resistance as the cylinder or screw. As described above, none of the alloys mentioned above can be said to satisfy both of the corrosion resistance and the wear resistance.

In order to overcome these problems, the present inventors have previously proposed highly corrosion resistant and abrasion resistant alloys as described in Japanese Patent Application Laid-Open Nos. Sho 61-143547 and 62-142705. These alloy have a composition comprising 0.5-3.0% of Si, 0.5-3.0% of B, 10-40% of Cr, 0.5-3.0% of Cu and the substantial balance of Ni or Co.

SUMMARY OF THE INVENTION

The present invention has been made in view of such situations and it is the first object to provide a novel highly corrosion resistant and abrasion resistant alloy capable of satisfactorily withstanding severe conditions of use.

In order to attain the foregoing object, the present inventors have tried to develop a novel abrasion resistant and corrosion resistant alloy taking notice of the following points.

In the case of an alloy including a hard phase and a bonding phase (matrix), since a local cell is formed between the hard phase as a cathode and the bonding phase at a basic corrosion potential as an anode, the matrix is preferentially corroded.

In view of the above, the present inventors have made earnest studies on such alloys containing the hard phase and the bonding phase (matrix) for finding the composition and the texture of alloys capable of obtaining extremely high corrosion resistance, by adding various alloying elements to the matrix and increasing the potential of the matrix phase thereby equalizing the corrosion potential between the matrix and hard grains and, as a result, have accomplished the present invention.

That is, the present invention concerns an wear resistant powder sintered alloy of excellent corrosion resistance, that is, a hard alloy containing from 15 to 95% of the hard phase composed of a $M_3B_2$ phase (M: Co, Cr, Ni or W in addition to Ni) in the matrix, wherein the content of the chemical ingredients in the entire hard alloy are 0.5-9.0% of B, 14.0-35.0% of Cr, 14.0-50.0% of one of more of Mo and W, up to 3.5% of Si, up to 5.0% of Fe, 0.5-4.0% of one or more of Cu, Ag, Au and Pt and the balance of one or more of Ni and Co and inevitable impurities and the matrix has a noble corrosion potential.

The second object of the present invention is to provide a powder sintered alloy in which the compositions having corrosion respectively resistance to corrosive gases such as fluorine gas, $SO_2$ gas and NOx gas are further defined respectively.

An wear resistant alloy of excellent corrosion resistance to halogen such as fluorine can be provided by an alloy, wherein the alloy comprises 1.0-3.5% of Si, 0.5-3.5% of B, 14-24% of Cr, 14-35% of Mo, 0.4-4.0% of Cu and the substantial balance of Ni, in addition to that the matrix has a noble corrosion potential.

An wear resistant alloy of excellent corrosion resistance to SOx such as $SO_2$ can be provided by an alloy, wherein the alloy comprises 1.0-3.5% of Si, 0.5-6.0% of B, 14-24% of Cr, 14-35% of Mo, 7-65% of Ni, 0.4–4.0% of Cu and the substantial balance of Co in addition to that the matrix has a noble corrosion potential.

Further, an wear resistant alloy of excellent corrosion resistance to NOx such as nitric acid can be provided by an alloy, wherein the alloy comprises 1.0–3.5% of Si, 0.5–6.0% of B, 24–30% of Cr, 14–35% of Mo, 0.4–4.0% of Cu and the substantial balance of at least one of Ni and Co in addition to that the matrix has a noble corrosion potential.

A further object of the present invention is to provide a composite material for molding plastics, ceramics, etc. excellent in corrosion resistance and wear resistance.

The object can be attained by disposing, to the inner circumferential surface of a cylinder and/or to the outer circumferential surface of a screw by hot isostatic pressing (HIP), a joined layer of an wear resistant powder sintered alloy containing from 15 to 95% of a hard phase composed of a $M_3B_2$ phase (M: Ni or Co, Cr, Mo or W) structure is in the matrix, wherein the hard alloy comprises 0.5–6.0% of B, 14.0–30.0% of Cr, 14.0–35.0% of Mo alone or in combination with W, up to 3.5% of Si, up to 5.0% of Fe, 0.5–4.0% of one or more of Cu, Ag, Au and Pt and the balance of one or more of Ni and Co and inevitable impurity, and the matrix has a noble corrosion potential.

In this case, it may be considered to constitute the cylinder entirely with the alloy as described above. However, if the entire cylinder is intended to be manufactured with the alloy, there are the following difficulties:

(a) Since the inner pressure of the cylinder upon injection some time reaches as high as 2000 atm, this may possibly bring about a disadvantage, particularly, of poor toughness.

(b) Since it is necessary to increase the thickness of a cylinder, for example, such that even a cylinder of about 30 mm$\phi$ inner diameter should have outer diameter of about 90 mm$\phi$, it is not advantageous to manufacture the cylinder only with the expensive alloy as described above.

(c) Since the strength of the alloy is extremely high, machining to the outer surface is difficult.

Accordingly, it is preferred to use high strength steel or heat resistant steel such as SCM 440, SNCM 439, SUS 304, SUS 316, etc. as the back metal (cylinder main body) and form the corrosion resistant and wear resistant alloy layers to the inner circumferential surface.

Since the powder sintered alloy according to the present invention has a high performance as the abrasion resistant alloy of excellent corrosion resistance, it can be used as the materials for various application uses in which both of the abrasion resistance and the corrosion resistance are required. Particularly, it is suitable as mechanical parts such as cylinders or screws of extrusion molding machines or as tool materials.

DETAILED DESCRIPTION AND EMBODIMENTS OF THE INVENTION

Figure 1:
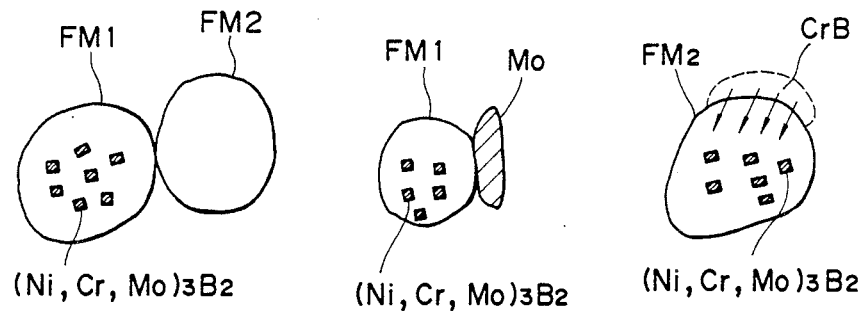
FIGS. 1 (a), (b) and (c) are explanatory views of models illustrating the difference of the sinterability

The reasons for defining the chemical compositions, etc. in the present invention are to be described below.

The content of the ingredient is expressed by percent by weight based on the entire alloy.

Si: up to 3.5%

Si has an effect of forming a dense $SiO_2$ film at the surface of the alloy to inhibit the adhesive wear and it is also effective for increasing the fluidity of molten alloy and also as an deoxidizer. However, if the content exceeds 3.5%, it forms silicides to cause undesired effect on the toughness and, accordingly, the amount of Si is defined as up to 3.5%.

B: 0.5–9.0%

B is an element to form hard borides with Ni, Cr, Mo, W and Co thereby contributing to the improvement of the wear resistance, particularly, abrasive wear. It is necessary to incorporate B by more than 0.5% in order to effectively attain these effects. However, if it exceeds 6.0%, it results in the reduction of the alloy toughness and, if it exceeds 9.0%, the toughness is so degraded as can not be used also as a tool. Accordingly, in the case of application use for plastic molding machines, etc. the amount of B is preferably within a range from 0.5 to 9.0%.

Cr: 14.0–35.0%

Cr has an effect of passivating the alloy and increasing the corrosion resistance to an oxidizing atmosphere such as nitric acid. However, since the critical value for the passivation is greater than 14.0%, at least 14.0% of Cr is necessary. In addition, Cr has an effect of forming hard borides with B thereby contributing to the improvement of the abrasion resistance. However, if it exceeds 35.0%, corrosion resistance to a reducing atmosphere such as hydrofluoric acid is reduced. Accordingly, the amount of Cr is within a range from 14.0 to 35.0% and, preferably, from 14.0 to 30.0%.

In a case of improving the corrosion resistance to halogen gases such as fluorine gas or SOx gases such as $SO_2$, the upper limit may be up to 24%. On the other hand, with regard to NOx gas, it is necessary to add by more than 24% in order to increase the corrosion resistance to an oxidizing atmosphere such as nitric acid.

Mo has an effect of increasing the corrosion resistance to a reducing atmosphere such as hydrofluoric acid and more than 14.0% of Mo is necessary for maintaining the pitting corrosion resistance. In addition, Mo, like that Cr, has an effect of forming hard borides with B thereby contributing to the improvement of abrasion resistance. However, since the toughness of the alloy is reduced if it exceeds 50.0% it is not undesired. Further, also in the case of joining with iron and steel material, the amount of Mo in excess of 35.0% is not preferred since a difference is formed for the heat expansion coefficient. Accordingly, the amount of Mo is within a range from 14.0% to 50.0%, preferably, from 14.0% to 35.0%.

W, like that Mo, has an effect of increasing the corrosion resistance to a reducing atmosphere such as hydrofluoric acid and can partially or fully substitute W. Also in this case, the content of Mo or the total content of Mo and W is within the range as described above.

Cu, Ag, Au, Pt: 0.5–20.0%

These noble metal elements are solid solubilized into the matrix thereby remarkably contributing to the improvement of the corrosion resistance.

In a case of dispersing ceramic particles such as of borides, for example, CrB into the matrix, since the matrix at a basic corrosion potential constitutes the anode, while the ceramic particles at a noble corrosion potential constitute the cathode to form a local cell, the matrix is preferentially corroded. Therefore, in the case of dispersing the second phase such as ceramics particles, the potential of the matrix has to be noble to improve the corrosion resistance. As a result of the study of the present inventors for overcoming such a problem, it has been found that Cu, Ag, Au and Pt can effectively make the potential of the matrix noble thereby improve the corrosion resistance.

For effectively obtaining this effect, it is necessary to add more than 0.4% of Cu, or a noble metal obtained by substituting Cu partially or entirely with one or more of Ag, Au and Pt. However, if it is added in excess of 4.0%, the effect is saturated and the alloy tends to be softened to reduce the wear resistance. In view of the above, the amount of the noble metal is defined within a range from 0.4 to 4.0% and one or more of Cu, Ag, Au and Pt is added.

However, it has been found by the study of the present inventors that addition within a range from 4.0 to 20.0% has an effect of, inversely, increasing the thermal expansion coefficient of the alloy system according to the present invention and can improve the cracking resistance and, accordingly, it is particularly preferred as the lining material for composite parts. That is, the thermal expansion is a phenomenon caused by the increase of oscillations between crystal lattices along with the elevation of the temperature. From the view point of electronic theory, the lattice oscillations are smaller and the thermal expansion coefficient is smaller as the bonding force between atoms constituting the crystal lattice is increased. On the other hand, the lattice oscillations are increased and thermal expansion coefficient becomes greater as the bonding force between the atoms is weakened. Among the addition elements in the alloy according to the present invention, Cr, Mo, W, Si and Co reduce the thermal expansion coefficient of the matrix since the bonding force between these atoms is strong. On the other hand, since Cu decreases the interaction bonding force with Ni, it causes the lattice oscillations to be increased and makes the thermal expansion coefficient of the matrix greater. Further, from the metallographical point of view, Cu has a clustering tendency within a short range thereby increasing the thermal expansion coefficient. In the case of the alloy system according to the present invention, it has been found that its thermal expansion coefficient shows a value $(12-14.5 \times 10^{-6})$ $(°C.^{-1})$ $(25°-600° C.)$ which is similar to the value: $14 \times 10^{-6}$ $(°C.^{-1})$ $(25°-600° C.)$ of the thermal expansion coefficient of mechanical structure steels, by the addition of Cu up to 20.0%. If it is added in excess of the limit, since the alloy is softened and shows a thermal expansion coefficient greater than that of the mechanical structure steels and, therefore, the lined alloy after HIP suffers from the residual tensile stresses, tending to be cracked. Accordingly, with the reasons as described above, one or more of Cu, Ag and Au can be added within a range from 4.0 to 20.0% in order to increase the thermal expansion coefficient to thereby improve the cracking resistance.

Fe: up to 5.0%

Fe has an effect of improving the corrosion resistance to hydrochloric acid as a reducing atmosphere, but it has no other effects for improving the characteristics required in the present invention. In the present invention, Fe is considered that as an impurity inevitably included in the course of melting the alloy in view of the demand that B is preferred to be added in the form of less expensive alloy of FeB than metal boron in the case of adding B. Further, since Fe greatly degrades the corrosion resistance to a reducing hydrochloric acid and an oxidizing nitric acid if it is contained in excess of 5.0%, the allowable amount of Fe is within a range from 0 to 5.0%.

Ni, Co: balance

Ni is an element having an effect for improving the corrosion resistance and, since it has a great corrosion resistance, particularly, to halogen gases, Ni is used as the balance. Since substitution of Ni with Co can provide an improvement for the corrosion resistance to $SO_2$ gas, up to 95.0% of Ni may be substituted with Co. Substitution of the total Ni with Co is not preferred since the corrosion resistance to the halogen gases is degraded. In the case of the alloy according to the present invention having the chemical compositions as described above, it is necessary that the hard phase comprising the $M_3B_2$ phase structure is contained within range from 15 to 95%. If the hard phase is less than 15%, the abrasion resistance becomes insufficient, on the other hand, if it exceeds 95%, the Weibull coefficient is reduced to less than 7 to increase the brittleness. Then, both of such contents are not preferred.

The meanings of the chemical compositions and the potential of the matrix in the present invention that have been explained theoretically are to be demonstrated specifically referring to the data.

Referring to alloys having chemical compositions (wt %) shown in Table 1, various kinds of alloys were prepared by reacting under sintering CrB by hot isostatic pressing (HIP) to Ni-(Co)-Mo-(W)-Si-(Cu-Pt-Au-Ag) atomized powder alloy.

Each of the obtained specimens were measured for the hardness, as well as applied with corrosion resistant test, abrasion resistant test and bend test. These results are shown in Table 3.

Corrosion resistant test pieces sized 6.5 mm$\phi \times 10$ mml were used, which were immersed in 10% hydrofluoric acid maintained at 50° C. for 100 hr, by measuring the weight loss and the corrosion resistance was evaluated. In the abrasion resistance test, the specific wear was measured by using an Ohgoshi type abrasion tester to evaluate the abrasion resistance.

Further, in order to demonstrate the addition effect of Cu for the noble metal element, specimens (1)–(8) shown in Table 2 were prepared by HIP sintering method, immersed in 10% HF solution at 50° C. and the measurement for the corrosion potential of the alloys was also conducted while using a calomel electrode as the standard electrode.

At first, the result of the measurement for the corrosion potential is considered.

No. 1, No. 2 and No. 17 in Table 2 are alloys of the compositions shown in Table 1. In Table 2, those having greater positive values (noble direction) have a tendency of less soluble to the HF solution.

It can be seen that the corrosion potential shifts to the more noble direction in the case of adding Cu to Ni-15Cr alloy ((4) matrix) (No. (5)), and adding Cu to Ni-15Cr-15Mo (No. (6)) (No. (7)) as compared with No. 5 or No. 6. The $M_3B_2$ ceramic phase (hard phase) shows a noble potential.

While on the other hand, the alloy No. 17 according to the present invention (No. 3) was prepared by dispersion of $M_3B_2$ phase to the Ni-Cr-Mo alloy (bonding phase). Since the matrix is made noble by the addition of Cu, the local cell effect is low and the corrosion potential is noble even if it is the composite structure alloy of the matrix-ceramics phase.

That is, it can be seen that it is better as the difference between the corrosion potential of the matrix metal and the corrosion potential of the hard phase is smaller. In this regard, the corrosion potential is different depending on the kind of the hard phases. Although it is difficult to specify the absolute value or critical value, it can be considered that the corrosion resistance can be obtained if the corrosion potential of the matrix is about more than −400 mV.

Based on the fundamental data described above, the result in Table 3 is to be explained.

Conventional materials No. 1 and No. 2 and Comparative materials No. 3–No. 14 involve problems regarding the conditions for corrosion resistance abrasion resistance, or bend strength.

That is, although the conventional material No. 1, which is a Ni-based self-fluxing alloy well known as the abrasion resistant alloy, is satisfactory in the abrasion resistance, however, since the corrosion potential shown in Table 2 is basic and the local cell effect for between ceramic phase and the matrix phase is great, it is extremely poor in the corrosion resistance as shown in Table 3.

The conventional material No. 2 is a Ni-Cr-Mo alloy of excellent corrosion resistance, which shows less local cell effect and satisfactory corrosion resistance (corrosion potential shown in Table 2 is noble) since it is a solid-solution alloy. However, it involves the problem for the wear resistance as shown in Table 3.

Further, each of the comparative materials No. 3–No. 5 is poor in the bend strength since excess Mo, Si and B are added respectively. The material No. 6 is degraded in the corrosion resistance since excess Cr is added. Comparative materials No. 7– No. 11, are satisfactory in the corrosion resistance since noble metal elements are added respectively to suppress to local cell effect. However, since the addition is excessive, the abrasion resistance is reduced. Although nobel metal elements are added to No. 12–No. 14, since the addition amount is small, local cell effect is not suppressed sufficiently and there is a problem in view of the corrosion resistance.

On the contrary, it is apparent that the alloys according to the present invention shown by No. 17–No. 23 have extremely excellent corrosion resistance and abrasion resistance, as well as the strength together. This is due to the control for each of the elements Ni, Co, Cr, Mo, W, Si and B each to an appropriate amount and effective suppression of the local cell effect by the noble metal elements. Although the corrosion resistance to hydrofluoric acid is reduced in No. 15 because of excess substitution of Ni with Co and there is a problem in the deflexion strength in No. 6 because of excess addition of W, they provide no substantial problems depending on the application uses.

TABLE 1

| | No. | Chemical compositions of alloy (wt %) | | | | | | | | | |
|---|---|---|---|---|---|---|---|---|---|---|---|
| | | Cr | Mo | Si | B | W | Cu | Co | Fe | Ni | Others |
| Conventional | 1 | 13.5 | — | 4.3 | 3.0 | — | — | — | 4.7 | Bal | — |
| material | 2 | 15.3 | 15.6 | — | — | 3.6 | — | — | 4.6 | Bal | — |
| Comparative | 3 | 15.0 | 54.3 | 3.0 | 8.0 | — | 1.0 | — | — | Bal | — |
| material | 4 | 21.0 | 34.0 | 6.0 | 2.5 | 3.0 | 1.5 | 4.0 | 1.0 | Bal | — |
| | 5 | 18.0 | 40.1 | 2.5 | 11.0 | 2.0 | 1.0 | 1.0 | 1.0 | Bal | — |
| | 6 | 37.0 | 16.1 | 2.5 | 2.5 | 1.0 | 1.0 | 2.0 | 0.5 | Bal | — |
| | 7 | 15.0 | 25.0 | 3.0 | 3.0 | 1.0 | 6.0 | 2.0 | 2.0 | Bal | — |
| | 8 | 15.0 | 25.0 | 3.0 | 3.0 | 1.0 | — | 2.0 | 2.0 | Bal | 6.0 Ag |
| | 9 | 15.0 | 25.0 | 3.0 | 3.0 | 1.0 | — | 2.0 | 2.0 | Bal | 6.0 Ag |
| | 10 | 15.0 | 25.0 | 3.0 | 3.0 | 1.0 | — | 2.0 | 2.0 | Bal | 6.0 Pt |
| | 11 | 15.0 | 25.0 | 3.0 | 3.0 | 1.0 | 2.5 | 2.0 | 2.0 | Bal | — |
| | 12 | 15.0 | 25.0 | 3.0 | 3.0 | — | — | 2.0 | 2.0 | Bal | 0.1 Ag, 0.1 Au |
| | 13 | 15.0 | 25.0 | 3.0 | 3.0 | 1.0 | 0.1 | 2.0 | 2.0 | Bal | 0.05 Pt, 0.1 Au |
| | 14 | 15.0 | 25.0 | 3.0 | 3.0 | 1.0 | 0.1 | 2.0 | 2.0 | Bal | 0.05 Pt, 0.05 Ag |
| Alloy | 15 | 15.0 | 25.0 | 3.0 | 3.0 | 1.0 | 1.0 | 48.0 | 2.0 | 2.0 | — |
| of the | 16 | 15.0 | 25.0 | 3.0 | 3.0 | 27.4 | 1.0 | 2.0 | 2.0 | Bal | — |
| invention | 17 | 15.0 | 15.0 | 3.0 | 3.0 | — | 1.0 | — | — | Bal | — |
| | 18 | 15.0 | 25.0 | 3.0 | 3.0 | — | 1.0 | 33.0 | — | 20.0 | — |
| | 19 | 15.0 | 15.0 | 3.0 | 2.5 | 12.0 | 1.0 | 10.0 | 2.0 | Bal | 0.5 Au, 1.5 Ag, 0.5 |
| | 20 | 15.0 | 25.0 | 3.0 | 2.5 | 1.0 | — | 5.0 | 2.0 | Bal | 1.0 Au |
| | 21 | 15.0 | 25.0 | 3.0 | 2.5 | 1.0 | — | 5.0 | 2.0 | Bal | 1.0 Ag |
| | 22 | 15.0 | 25.0 | 3.0 | 2.5 | 1.0 | — | 5.0 | 2.0 | Bal | 1.0 Pt |
| | 23 | 20.0 | 20.0 | 3.0 | 4.5 | 8.0 | 1.0 | 5.0 | 2.0 | Bal | 0.5 Au, 0.5 Ag, 1.5 |

TABLE 2

Corrosion potential of alloy

| No. | Alloy | Corrosion potential (mv) | Remarks |
|---|---|---|---|
| 1 | No. 1 (Table 1) | − 578 (basic) | Conventional material |
| 2 | No. 2 (Table 1) | − 301 (noble) | Conventional material |
| 3 | No. 17 (Table 1) | − 352 (noble) | Alloy of the invention |
| 4 | Ni-15Cr | − 493 (base) | Comparative material |
| 5 | Ni-15Cr-1Cu | − 435 (base) | Comparative material |
| 6 | Ni-15Cr-15Mo | − 293 (noble) | Comparative material |
| 7 | Ni-15Cr-15Mo-1Cu | − 258 (noble) | Comparative material |
| 8 | $M_3B_2$ | + 401 (noble) | Comparative material |

Note: 8 means ceramic particles

TABLE 3

| | | | Characteristics of alloy | | | |
|---|---|---|---|---|---|---|
| No. | Hardness (mHv) | Weight loss (HF/mg) | Specific wear $(mm^3/kg \cdot mm)(\times 10^{-8})$ | Bend strength $(kg/mm^2)$ | Corrosion potential | Remarks |
| 1 | 642 | 82.5 | 2.4 | 105 | base | Conventional |
| 2 | 439 | 16.5 | 146.0 | 96 | noble | material |
| 3 | 1013 | 13.8 | 0.8 | 117 | noble | Comparative |
| 4 | 951 | 17.2 | 1.8 | 107 | noble | material |
| 5 | 1089 | 15.5 | 0.6 | 83 | noble | |
| 6 | 779 | 22.4 | 2.3 | 121 | base | |
| 7 | 615 | 15.0 | 6.1 | 205 | noble | |
| 8 | 608 | 14.8 | 6.9 | 198 | noble | |
| 9 | 605 | 14.5 | 7.1 | 184 | noble | |
| 10 | 618 | 14.7 | 6.7 | 202 | noble | |
| 11 | 598 | 14.3 | 6.6 | 195 | noble | |
| 12 | 663 | 24.6 | 2.8 | 208 | base | |
| 13 | 678 | 22.5 | 2.7 | 248 | base | |
| 14 | 663 | 23.7 | 2.8 | 235 | base | |
| 15 | 708 | 28.3 | 2.2 | 223 | base | Alloy of the |
| 16 | 997 | 15.5 | 1.9 | 124 | noble | invention |
| 17 | 578 | 14.8 | 2.9 | 204 | noble | |
| 18 | 723 | 15.2 | 2.4 | 235 | noble | |
| 19 | 755 | 15.0 | 2.1 | 252 | noble | |
| 20 | 641 | 14.3 | 2.6 | 245 | noble | |
| 21 | 643 | 14.6 | 2.5 | 244 | noble | |
| 22 | 653 | 14.8 | 2.4 | 251 | noble | |
| 23 | 765 | 14.2 | 2.1 | 207 | noble | |

The high alloys having the chemical compositions as described above are properly prepared into powder sintered alloys by the production method as described below.

That is, the foregoing properties can be attained to obtain products of high performance by a process of sintering of the rapid solidified powder by HIP (hot isostatic press). In this regard, preparation of the products is easier as compared with the case of the self fluxing wear resistant alloy developed before on the premise of using metal spray in the atmosphere, by which such high alloying is impossible by the restriction in view of the production (oxidation of alloying compositions, particularly, Mo. etc.)

Particularly, in the case of the alloys containing from 20 to 35% of Mo, it is appropriate to employ the following production process.

That is, in the case of the alloys described above, the equilibrium composition of the boride (at %) that provides the corrosion resistance and the abrasion resistance is $(Ni_{0.09}Cr_{0.32}Mo_{0.59})$ $B_2$. However, if the Mo content is high under the coexistence of Cr and B, viscosity of the molten alloy is increased and the atomization is not easy. In view of the above, by utilizing the fact that Ni-Mo-Si-Cu mother alloy in which Cr and B are not present together can easily be atomized even if Mo is contained, a mother alloy comprising 1.2–4.9% of Si, 23.4–49.3% of Mo, 0.5–5.6% of Cu and the balance of Ni is at first produced by a gas atomizing method, which is admixed with an appropriate amount of Cr and B or chromium boride such as CrB (also including CrB and $Cr_2B$) and then heated to an appropriate temperature, whereby Cr and B or CrB particles were decomposed once at the interface of the mother alloy powder, along with the proceeding of the sintering, and then Cr and B are diffused into the mother alloy powder to form fine bride equilibrium $M_3B_2$ phase thereby enabling to obtain a sintered powdery alloy having fine structure.

Accordingly, the alloy thus obtained is suitable as the cylinder material for injection molding machines or extrusion molding machines for plastics and ceramics.

The definition for the compositions in the mother alloy means the contents necessary for obtaining the final sintered powdery alloy. It will be apparent that the reaction sintering temperature is such a high level as Cr and B can sufficiently be diffused into the mother alloy.

The method of adding CrB to the mother alloy with a high Mo content can be applied generally not only to the production of Ni-based alloys but also to the production of alloys for forming a Fe- or Co-based $M_3B_2$ phase (M represents Ni, Co, Fe, Cr, Mo or W).

EXAMPLE 1

(Halogen gas resistance)

Alloys having the chemical compositions (wt %) shown in Table 4 were melted and cast by the customary method. Among the conventional materials, Ni-Mo-Cr alloy shown by No. 3 was prepared by applying cold aging to a commercial product to deposit intermetallic compounds (P phase) and hardened.

Each of the thus obtained specimens was measured for the hardness and applied with corrosion resistant test and wear resistant test. Corrosion resistant test specimens sized 6.5 mm$\phi \times$ 10 mml were used, which were immersed in a 10% hydrofluoric acid maintained at 50° C. for 24 hours and evaluated for the corrosion resistance by measuring the weight loss.

The wear resistant test was conducted by the Ohgoshi type wear resistant tester using SUJ-2 as the mating material and under the conditions of the final load of 6.3 kg, frictional velocity of 0.94 m/s and friction distance of 400 m. The specific wear was measured to evaluate the wear resistance.

These results are shown in Table 5.

TABLE 4

| Alloy No. | Cr | Mo | Si | B | C | W | Fe | Cu | Co | Ni | Remarks |
|---|---|---|---|---|---|---|---|---|---|---|---|
| 1 | 13.5 | — | 4.3 | 3.0 | 0.75 | — | 4.7 | — | — | Bal. | Conventional material |
| 2 | 15 | 15 | — | — | — | 3 | 4 | — | 2 | Bal. | Conventional material |
| 3 | 15.3 | 15.6 | — | — | — | 3.6 | 4.6 | — | — | Bal. | Conventional material |
| 4 | 15 | 15 | 3 | 3 | — | 3 | 4 | — | — | Bal. | Comparative material |
| 5 | 15 | 15 | 3 | 3 | — | — | — | 0.2 | — | Bal. | Comparative material |
| 6 | 15 | 15 | 3 | 3 | — | — | — | 4.0 | — | Bal. | Comparative material |
| 7 | 15 | 15 | 3 | 0.2 | — | — | — | 1 | — | Bal. | Comparative material |
| 8 | 15 | 15 | 0.5 | 3 | — | — | — | 1 | — | Bal. | Comparative material |
| 9 | 15 | 15 | 3 | 3 | — | — | — | 1 | Bal. | — | Comparative material |
| 10 | 15 | 25 | 3 | 3 | — | — | — | 1 | Bal. | 5 | Comparative material |
| 11 | 20 | 20 | 3 | 3 | — | — | — | 2 | Bal. | — | Comparative material |
| 12 | 15 | 25 | 3 | 3 | — | — | — | 1 | 33 | Bal. | Material of the invention |
| 13 | 15 | 25 | 3 | 3 | — | — | — | 1 | 13 | Bal. | Material of the invention |
| 14 | 15 | 15 | 3 | 3 | — | — | — | 1 | — | Bal. | Material of the invention |
| 15 | 15 | 20 | 3 | 3 | — | — | — | 1 | — | Bal. | Material of the invention |
| 16 | 15 | 25 | 3 | 3 | — | — | — | 1 | — | Bal. | Material of the invention |
| 17 | 15 | 30 | 3 | 3 | — | — | — | 1 | — | Bal. | Material of the invention |
| 18 | 20 | 20 | 3 | 3 | — | — | — | 1 | — | Bal. | Material of the invention |
| 19 | 20 | 20 | 3 | 3 | — | — | — | 2 | — | Bal. | Material of the invention |
| 20 | 20 | 15 | 3 | 3 | — | — | — | 1 | — | Bal. | Material of the invention |

TABLE 5

| Alloy No. | Hardness (mHv) | Weight loss (mg) | Specific wear (mm$^3$/kg·mm)(× 10$^{-8}$) | Corrosion potential | Remarks |
|---|---|---|---|---|---|
| 1 | 642 | 24.9 | 2.38 | −578 | Conventional material |
| 2 | 268 | 4.6 | 160.0 | −305 | " |
| 3 | 439 | 5.0 | 146.0 | −301 | " |
| 4 | 571 | 14.9 | 3.60 | −423 | Comparative material |
| 5 | 418 | 8.0 | 3.51 | −401 | " |
| 6 | 340 | 4.6 | 5.80 | −333 | " |
| 7 | 295 | 4.5 | 12.1 | −334 | " |
| 8 | 330 | 5.8 | 6.82 | −376 | " |
| 9 | 424 | 46.3 | 3.48 | −603 | " |
| 10 | 663 | 23.6 | 2.35 | −553 | " |
| 11 | 627 | 37.9 | 1.96 | −473 | " |
| 12 | 621 | 2.9 | 2.45 | −319 | Material of the invention |
| 13 | 619 | 3.0 | 2.41 | −320 | " |
| 14 | 374 | 4.6 | 3.93 | −331 | " |
| 15 | 364 | 5.3 | 3.09 | −343 | " |
| 16 | 648 | 4.6 | 2.56 | −342 | " |
| 17 | 781 | 4.9 | 1.27 | −339 | " |
| 18 | 612 | 5.9 | 1.87 | −356 | " |
| 19 | 592 | 5.2 | 2.08 | −357 | " |
| 20 | 550 | 7.6 | 2.36 | −368 | " |

As apparent from Table 5, conventional materials No. 1–No. 13 and comparative materials No. 4–No. 11 involve problems for the performance as the requirement for the corrosion resistance or wear resistance.

That is, although the conventional material No. 1 which is the Ni-based self fluxing alloy well-known as the wear resistance alloy shows satisfactory wear resistance, Mo is not added because of the restriction in view of the production process, self fluxing property and the viscosity of the molten alloy, and the corrosion resistance is extremely poor. Further, the conventional material No. 2 which is a Ni-Cr-Mo alloy of excellent corrosion resistance shows no wear resistance at all since this is a solid solution alloy. The conventional material No. 3 is an alloy prepared by providing the same type of alloy No. 2 with hardness by cold aging and, although the wear resistance is somewhat improve as compared with No. 2, it is not yet sufficient.

Although the comparative material No. 4 is satisfactory in the resistance, since it does not contain Cu, the matrix is preferentially corroded due to the local cell effect between the hard boride particles and the matrix and, accordingly, the corrosion resistance is extremely poor. Comparative material No. 5 which contains Cu additive but little somewhat lacks in the corrosion resistance. On the contrary, the comparative material No. 5 with excessive Cu addition, shows improved the corrosion resistance but reduced abrasion resistance. Comparative material No. 7 shows no sufficient wear resistance since the addition amount of B is insufficient. Comparative material No. 8 shows no sufficient wear resistance since the addition amount of Si is insufficient.

On the contrary, materials No. 14–No. 20 according to the present invention have both excellent corrosion resistance and wear resistance.

It has been confirming that, among Comparative Examples No. 9–No. 13 in which Ni is partially or entirely substituted with Co, No. 9–No. 11 involve a problem in view of the fluoro resistance.

Alloy powder having the chemical compositions (wt %) shown by alloy No. FM1 in Table 6 was prepared by a gas atomizing process. The rapid solidified alloy powder was treated with HIP (hot isostatic press) and applied with the same corrosion resistance test and the wear resistant test as those in Example 2.

As a result, as shown in Table 7, the alloy has both excellent corrosion resistance and wear resistance and, particularly, since the hard boride phase was dispersed uniformly and finely in the case of rapid solidification by the atomizing process, the hardness and the wear resistance could be improved as compared with the cast alloy of the same composition (No. 14 in Table 2).

Further, as shown in Table 8, the tensile strength and the compression strength of the HIP-processed alloy of fine structure are greater than those of the mechanical structure steels and, since the product also has a plastic deformation performance, it can be used also as the screw material for injection molding and extrusion molding machines.

TABLE 7

| | Corrosion resistance and wear resistance of the HIP-processed alloy | | |
|---|---|---|---|
| Hardness (mHv) | Corrosion wear (mg) | Specific wear amount (mm$^3$/kg · mm)($\times 10^{-8}$) | Remarks |
| 535 | 4.5 | 2.14 | Material of the invention |

TABLE 8

| | Strength of the HIP-processed alloy | | | |
|---|---|---|---|---|
| Tensile strength (kgf/mm$^2$) | Compression strength (kgf/mm$^2$) | Elongation (%) | Draiw ratio (%) | Remarks |
| 134.2 | 258.7 | 0.5 | 1.0 | Material of the invention |

A molten solution of a mother alloy having chemical compositions (wt %) shown by the alloy No. FM2 in Table 6 was finely powderized by a gas atomizing process.

CrB powder having the chemical compositions (wt %) shown in Table 9 and Mo powder were blended at a blending ratio shown in Table 10. The alloy composition after blending is shown together in Table 10. After blending, the blend was mixed by wet or dry process using an attritor. The powder mixture was sintered and sintered by hot isostatic pressing (HIP).

After sintering, the hardness was measured for each of the alloys. The results are shown in Table 11.

Further, corrosion resistance was examined for a portion of them. The results are shown in Table 12. In the corrosion test, test specimens sized 6.5 mm$\phi \times$ 10 mml were immersed in 10% HF corrosive solution at 50° C. for 100 hours, and the weight loss was measured.

As apparent from Table 11, etc. comparative materials shown by No. 2–No. 4 involve problems in view of the hardness and the homogenity of the structure.

The comparative material No. 2 sintered only from the powder of the mother alloy FM2 by HIP process, shows insufficient hardness since the composition is out of the range of the alloy according to the present invention.

Comparative material No. 3 is an alloy prepared by mixing the powder of the mother alloy FM1 with the powder of the mother alloy FM2 of high Mo content. Since the equilibrium phase (Ni$_{0.09}$Cr$_{0.32}$Mo$_{0.59}$)$_3$B$_2$ phase is formed from the first, in the mother alloy FM1, if the powder of the mother alloy FM1 and the powder of the mother alloy FM2 are mixed and sintered, diffusion of each of the elements is not accelerated during sintering, as a result, extremely in homogen structure is formed (refer to FIG. 1(a)). In addition, increase in the hardness was neither recognized.

Comparative example No. 4 is prepared by adding pure Mo powder to the powder of mother alloy FM1 for obtaining a high Mo alloy. Like that the case of the Comparative material No. 3, since (Ni$_{0.09}$Cr$_{0.3}$-$_2$Mo$_{0.59}$)$_3$B$_2$ phase is formed prior to the sintering in the mother alloy FM$_1$ powder and since the diffusion rate of Mo is low, etc., no homogenizing reaction for the elements is proceeded during HIP and the Mo powder remains in the granular boundary (refer to FIG. 1(b)). Accordingly, since the increase in the boride phase due to Mo addition does not occur, hardness is not increased even compared with the comparative material No. 1 prepared by applying the HIP treatment only to the power of the mother material FM1.

On the contrary, in the case of the materials according to the present invention shown by No. 5–No. 7, that is, in the case of admixing the CrB powder to the powder of the mother alloy FM2 (30.99 Mo-3.75 Si-1.11 Cu; balance Ni) followed by sintering, the hardness is remarkably increased as compared with the comparative material No. 2 prepared by sintering only the powder of the mother alloy FM2. This is caused, as shown by the model in FIG. 1(c), that since CrB is once decomposed because of the formation of the equilibrium phase (Ni$_{0.09}$Cr$_{0.32}$Mo$_{0.59}$)$_3$B$_2$, and then diffuses into the powder of the mother alloy FM2 of high Mo content and, as a result, fine (Ni$_{0.09}$Cr$_{0.32}$Mo$_{0.59}$)$_3$B$_2$ phase of less than 5 $\mu$m size is dispersed in the final alloy to form a uniform fine structure, thereby causing increase in the hardness.

Further, with respect to the corrosion resistance, it is apparent as shown in Table 12 that the alloys No. 5–No. 7 of the material according to the present invention are substantially comparable with No. 1 of excellent corrosion resistance (HIP alloy shown in Example 2) and have excellent hydrofluoric acid resistance.

Also in the case of admixing Cr powder and B powder to the powder of Ni-Mo-Si-Cu mother alloy, since the reaction sintering occurs due to the same mechanism as that in the case of the material No. 5 according to the present invention, similar result can be obtained. However, since pure B powder is extremely expensive, this can not be said suitable to the industrial process.

TABLE 6

Chemical compositions of mother alloy powder

| Mother alloy No. | Cr | Mo | B | Si | Cu | Ni |
|---|---|---|---|---|---|---|
| FM1 | 15.01 | 14.79 | 2.38 | 3.08 | 1.00 | Bal |
| FM2 | — | 30.99 | — | 3.75 | 1.11 | Bal |

TABLE 9

Chemical compositions of CrB (wt %)

| B | C | Cr |
|---|---|---|
| 17.88 | 0.20 | Bal |

TABLE 10

Blending ratio of various powder and chemical compositions of alloy

| No. | Blending ratio of powder (wt %) | | | | Chemical composition of alloy (wt %) | | | | | | Mixing method | Mixing time | Remarks |
|---|---|---|---|---|---|---|---|---|---|---|---|---|---|
| | FM1 | FM2 | CrB | Mo | Cr | Mo | B | Si | Cu | Ni | | | |
| 1 | 100 | — | — | — | 15.01 | 14.79 | 2.38 | 3.08 | 1.00 | Bal | — | — | Example |
| 2 | — | 100 | — | — | — | 30.99 | — | 3.75 | 1.11 | " | — | — | Comparative material |
| 3 | 45.5 | 45.5 | 9 | — | 15 | 20 | 3 | 3 | 1 | " | wet | 3 hr | Comparative material |
| 4 | 82 | — | 3 | 15 | 15 | 25 | 3 | 3 | 1 | " | wet | 3 hr | Comparative material |
| 5 | — | 81.9 | 18.1 | — | 15 | 25 | 3 | 3 | 1 | " | wet | 3 hr | Material of the invention |
| 6 | — | 81.9 | 18.1 | — | 15 | 25 | 3 | 3 | 1 | " | dry | 5 hr | Material of the invention |
| 7 | — | 75.8 | 24.2 | — | 20 | 23 | 4.2 | 2.9 | 0.9 | " | dry | 5 hr | Material of the invention |

TABLE 11

Hardness of alloy

| No. | Hardness (mHv) | Remarks |
|---|---|---|
| 1 | 535 | Example 2 |
| 2 | 366 | Comparative material |
| 3 | 543 | Comparative material |
| 4 | 472 | Comparative material |
| 5 | 648 | Material of the invention |
| 6 | 706 | Material of the invention |
| 7 | 866 | Material of the invention |

TABLE 12

Corrosion resistance of alloy

| No. | Weight loss (mg) | Corrosion potential (mv) | Remarks |
|---|---|---|---|
| 1 | 15.0 | −334 | Example 2 |
| 5 | 16.0 | −351 | Material of the invention |
| 6 | 13.8 | −354 | Material of the invention |
| 7 | 9.3 | −346 | Material of the invention |

Figure 2:
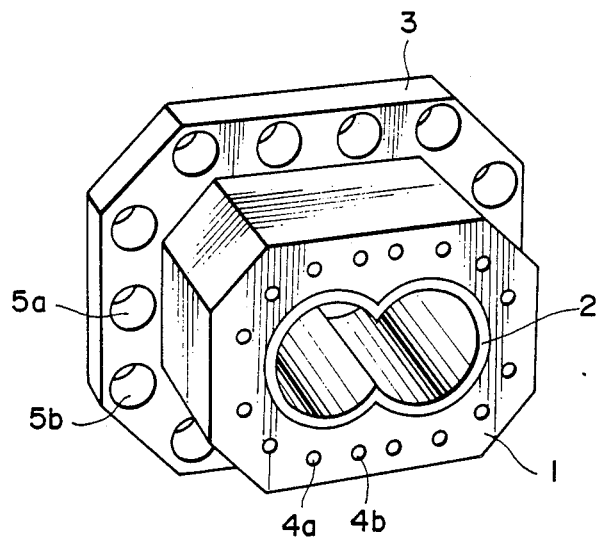
FIG. 2 is a perspective view of a two-shaft cylinder for use in a composite injection molding machine lined with the alloy according to the present invention.

For the alloys shown by No. 6 and No. 7 in Table 11, powder was packed to the mother material such as SCM 440, degased, applied with vacuum sealing and then subjected to hot isostatic pressing (HIP) under the conditions of 950° C. and 1000 atm as shown in FIG. 2. After HIP, when examining the cross section of a composite injection molding machine cylinder having a lining layer 2 prepared by lining the alloy according to the present invention to the inner circumferential surface of the cylinder main body 1, the alloy according to the present invention was uniformly joined to the mother material.

As the mother material, low carbon steels, austenite stainless steels, etc. can also be selected in addition to SCM 440.

Furthermore, when joining strength with each of the mother materials SCM 440, S25C, SUS 304 was examined for each of the alloys shown in the example, since the joining surface is strong in each of the cases, breakage occurs on the side of the mother material, indicating the numerical values corresponding to the tensile strength for each of the mother materials as shown in Table 13.

TABLE 13

Measured joining strength

| Mother material | Joining strength (kgf/mm$^2$) |
|---|---|
| SCM 440 | 73.2 |
| S25C | 56.9 |
| SUS 304 | 36.7 |

EXAMPLE 2

(SO$_2$ gas resistance)

Sintered alloys having the chemical compositions (mass %) shown in Table 14 were produced. The alloys indicated as "atomized powder"+ HIP) in the remarks of the table are HIP-processed products from rapid solidified powder by an argon gas atomization. Further, the alloys indicated as "reaction sintering" were prepared by admixing CrB to the atomized powder of Co-Ni-Mo-Si-Cu, applying reaction sintering in HIP, thereby uniformly dispersing borides (Co, Ni, Cr, Mo)$_3$B$_2$ of several micron meters.

For each of the obtained specimens, the hardness was measured and the corrosion resistance test and the wear resistance test were conducted. Corrosion resistance test specimens sized 6.5 mm$\phi$×10 mml were used, which were immersed in 15% sulfuric acid maintained at 50° C. for 100 hours, and the weight loss was measured to evaluate the corrosion resistance in SO$_2$ ions. Furthermore, while considering that halogen elements may be contained in the resin, the same test was conducted also in a 10% hydrofluoric acid to evaluatae the corrosion resistance. Further, the wear resistance test was conducted by an Ohgoshi type wear resistance tester, using SUJ-2 as the mating material and under the conditions of the final load of 6.3 kg, frictional velocity of 0.94 m/s and friction distance of 400 m, by which the specific abrasion amount and was measured to the abrasion resistance.

These results are shown in Table 15.

atmosphere. Therefore, its corrosion resistance to sulfuric acid is extremely poor.

The conventional material No. 2 is an wear resistance

TABLE 14

| Alloy No. | Chemical compositions (wt %) | | | | | | | | | | Remarks | |
|---|---|---|---|---|---|---|---|---|---|---|---|---|
| | Cr | Mo | Si | B | C | W | Fe | Cu | Co | Ni | | |
| 1 | 13.5 | — | 4.3 | 3.0 | 0.75 | — | 4.7 | — | — | Bal | Conventional Material | Atomized powder + HIP |
| 2 | 25 | — | 1.6 | 2.9 | 0.9 | 11 | — | 1 | Bal | 16 | Conventional Material | Atomized powder + HIP |
| 3 | 15 | 15 | 8 | 2.5 | — | — | — | 1 | — | Bal | Conventional Material | Atomized powder + HIP |
| 4 | 20 | 20 | 3 | 3 | — | — | — | 2 | Bal | — | Comparative Material | Reaction sintering |
| 5 | 14 | 14.5 | 1.0 | 1.3 | — | — | — | 1.0 | 1.2 | 66 | Comparative Material | Atomized powder + HIP |
| 6 | 15 | 15 | 3 | 3 | — | — | — | 1 | 57 | 6 | Comparative Material | Atomized powder + HIP |
| 7 | 15 | 15 | 3 | 2.5 | — | — | — | — | 47 | 17 | Comparative Material | Atomized powder + HIP |
| 8 | 15 | 15 | 3 | 3 | — | — | — | 0.2 | 46.8 | 17 | Comparative Material | Atomized powder + HIP |
| 9 | 15 | 15 | 3 | 3 | — | — | — | 5.0 | 42 | 17 | Comparative Material | Atomized powder + HIP |
| 10 | 15 | 15 | 3 | 0.2 | — | — | — | 1 | 40.8 | 25 | Comparative Material | Atomized powder + HIP |
| 11 | 15 | 15 | 0.5 | 3 | — | — | — | 1 | 40.5 | 25 | Comparative Material | Atomized powder + HIP |
| 12 | 30 | 15 | 2 | 2.8 | — | — | — | 1 | 29.2 | 20 | Comparative Material | Atomized powder + HIP |
| 13 | 15 | 40 | 3 | 6 | — | — | — | 1 | 24 | 15 | Comparative Material | Atomized powder + HIP |
| 14 | 15 | 15 | 3 | 2.5 | — | — | — | 1 | 50.5 | 13 | Material of the invention | Atomized powder + HIP |
| 15 | 15 | 15 | 3 | 2.5 | — | — | — | 1 | 55.5 | 8 | Material of the invention | Atomized powder + HIP |
| 16 | 15 | 25 | 3 | 3 | — | — | — | 1 | 33 | 20 | Material of the invention | Reaction sintering |
| 17 | 15 | 25 | 3 | 3 | — | — | — | 1 | 13 | 40 | Material of the invention | Reaction sintering |

TABLE 15

| Alloy No. | Hardness (mHv) | Weight loss (sulfuric acid) (mg) | Weight loss (hydrofluoric acid) (mg) | Specific wear $(mm^3/kg \cdot mm)(\times 10^{-8})$ | Corrosion potential | Remarks |
|---|---|---|---|---|---|---|
| 1 | 752 | 398.2 | 82.5 | 2.0 | base | Conventional material |
| 2 | 765 | 36.4 | 34.5 | 1.8 | " | |
| 3 | 535 | 2.7 | 15.0 | 2.2 | noble | |
| 4 | 787 | 2.5 | 126.3 | 1.6 | base | Comparative Material |
| 5 | 520 | 2.7 | 16.7 | 2.4 | noble | |
| 6 | 704 | 2.3 | 71.9 | 2.0 | base | |
| 7 | 663 | 96.0 | 147.2 | 2.1 | " | |
| 8 | 647 | 28.5 | 58.9 | 2.2 | " | |
| 9 | 497 | 2.4 | 15.5 | 2.7 | noble | |
| 10 | 518 | 2.6 | 18.0 | 2.6 | " | |
| 11 | 543 | 2.5 | 16.5 | 2.2 | " | |
| 12 | 790 | 18.0 | 46.0 | 1.9 | base | |
| 13 | 958 | 2.2 | 14.0 | 0.9 | noble | |
| 14 | 714 | 2.2 | 20.1 | 1.9 | " | Material of the Invention |
| 15 | 685 | 2.3 | 24.2 | 2.0 | " | |
| 16 | 753 | 2.3 | 14.8 | 1.9 | " | |
| 17 | 774 | 2.4 | 14.5 | 1.8 | " | |

As apparent from Table 15, conventional materials No. 1–No. 3 and comparative materials No. 4–No. 13 involve problems in view of the performance for the requirement of the corrosion resistance or wear resistance.

That is, the conventional material No. 1 which is a Ni-based self-fluxing alloy well-known as an wear resistant alloy is satisfactory in the wear resistance, but Mo can not be added because of the restriction in view of the production process, self-fluxing property, viscosity of the molten alloy, oxidation upon metal spray in the alloy developed for injection molding machines of plastics. Since Co-based material is used instead of Ni-based material which tends to cause grain boundary corrosion to S, although the sulfuric acid resistance is improved as compared with that of No. 1, it is not yet satisfactory.

The conventional material No. 3, which had been previously developed by the present inventors for fluoro resin molding, contains a great amount of Mo resistant to S and, further, Cu is added for equalizing the potential between the boride ceramic phase and the matrix in the alloy and, accordingly, it shows rather satisfactory sulfuric acid resistance. However, since it is a Ni-based alloy, the sulfuric acid resistance is poor as compared with the alloy according to the present invention and, further, there is a problem in the SO₂ gas atmosphere near 400° C.

On the other hand, since the comparative material No. 4 is based on Co and contains Mo and Co, the sulfuric acid resistance is improved. However, since it is a Co-based alloy, the material has no hydrofluoric acid resistance to bring about a problem in view of the practical use.

The comparative material No. 5 is an alloy containing 66% Ni but it is poor in the sulfuric acid resistance because of its excess Ni content.

The comparative material No. 6 is based on Co and contains 6% Ni. Although the sulfuric acid resistance is satisfactory, there is a problem in the hydrofluoric acid resistance due to the insufficient Ni content.

The comparative material No. 7 has satisfactory wear resistance but, since it does not contain Cu, the matrix is preferentially corroded due to the local cell effect between the hard boride particles and the matrix to show extremely poor corrosion resistance.

The comparative material No. 8 lacks in the corrosion resistance since it contains Cu but only in a small addition amount. On the contrary, the material No. 8 with an excess Cu addition has an improved corrosion resistance but with reduced hardness and insufficient wear resistance.

The comparative material No. 10 has no sufficient wear resistance because of its insufficient addition amount of B. The comparative material No. 11 has no sufficient wear resistance because of its insufficient addition amount of Si.

The comparative material No. 12 shows rather reduced corrosion resistance to sulfuric acid in a reducing atmosphere because of excess addition amount of Cr and involves a problem in view of the toughness. The material No. 13 contains excess Mo and B greater than the amount defined in the present invention and, accordingly, stresses due to the difference of the thermal expansion becomes excessive when lined to the inner surface of SCM-440 steels, by which cracking is developed to the lining phase to bring about a practical problem.

On the contrary, it can be seen that the materials No. 14–No. 17 according to the present invention have both excellent corrosion resistance and wear resistance.

For the alloy shown by No. 16 in Example 3, powder was packed into the mother material such as SCM 440 as shown in FIG. 1, degased and applied with vacuum sealing and, thereafter, subjected to hot isostatic press (HIP) under the conditions of 950° C. and 1000 atm. After HIP, when examine the cross section of a composite injection molding cylinder having a lining layer 2 prepared by lining the alloy according to the present invention to the inner circumferential surface of the cylinder main body 1, the alloy according to the present invention was uniformly joined to the mother material.

As the mother material, low carbon steels, austenite stainless steels, etc. can be selected in addition to SCM 440. When the joining strength of the alloy shown by No. 16 in Example 1 with each of the mother materials SCM 440, S25C and SUS 304 was examined, since the joining phase is strong, breakage occurs on the side of the mother material in any of the cases as, indicating numerical values corresponding to the tensile strength for each of the mother materials as shown in Table 13.

TABLE 13

| Mother material | Measured joining strength Joining strength (kgf/mm²) |
|---|---|
| SCM 440 | 74.6 |
| S25C | 55.8 |
| SUS 304 | 37.2 |

EXAMPLE 3

(NOx gas resistance)

Alloys having the chemical compositions (wt %) shown in Table 17 were produced in the same manner as in Examples 1–2.

For each of the obtained specimens, the hardness was measured and the corrosion resistance test and the wear resistance test were conducted. Corrosion resistance test specimens sized 6.5 mmφ×10 mml were used, which were immersed in a 6% nitric acid maintained at 50° C. for 100 hours and the weight loss was measured to evaluate the corrosion resistance. Further, the abrasion resistance test was conducted by the Ohgoshi type wear resistance tester, using SUJ-2 as the mating material and under the conditions of the final load of 6.3 kg, frictional velocity of 0.94 m/s and friction distance of 400 m, and the specific wear was measured to evaluate the resistance.

These results are shown in Table 18.

TABLE 17

| Alloy No. | Cr | Mo | Si | B | Cu | Co | Ni | Fe | Remarks |
|---|---|---|---|---|---|---|---|---|---|
| 1 | 13.5 | — | 4 | 3 | — | — | Bal. | 4.7 | Conventional material |
| 2 | 15 | 15 | 3 | 3 | 1 | Bal. | — | — | Comparative material |
| 3 | 15 | 25 | 3 | 3 | 1 | Bal. | — | — | Comparative material |
| 4 | 15 | 30 | 3 | 3 | 1 | Bal. | — | — | Comparative material |
| 5 | 20 | 20 | 3 | 3 | 1 | Bal. | — | — | Comparative material |
| 6 | 20 | 20 | 3 | 3 | 5 | Bal. | — | — | Comparative material |
| 7 | 15 | 25 | 3 | 3 | 1 | Bal. | 20 | — | Comparative material |
| 8 | 15 | 25 | 3 | 3 | 1 | Bal. | 40 | — | Comparative material |
| 9 | 15 | 30 | 3 | — | 1 | — | Bal. | — | Comparative |

TABLE 17-continued

| Alloy No. | Chemical composition wt % | | | | | | | | Remarks |
| --- | --- | --- | --- | --- | --- | --- | --- | --- | --- |
| | Cr | Mo | Si | B | Cu | Co | Ni | Fe | |
| 10 | 20 | 20 | 3 | 3 | 0.5 | — | Bal. | — | Comparative material |
| 11 | 25 | 15 | 3 | 3 | 1 | Bal. | — | — | Material of the invention |
| 12 | 25 | 15 | 3 | 3 | 1 | — | Bal. | — | Material of the invention |
| 13 | 30 | 15 | 3 | 3 | 1 | — | Bal. | — | Material of the invention |

TABLE 18

| Alloy No. | Hardness (mHv) | Weight loss (mg) | Specific wear (mm$^3$/kg · mm)(× $10^{-8}$) | Remarks |
| --- | --- | --- | --- | --- |
| 1 | 439 | 1708 | 2.25 | Conventional material |
| 2 | 424 | 62.2 | 3.48 | Comparative material |
| 3 | 663 | 238.6 | 2.35 | Comparative material |
| 4 | 702 | 360.9 | 2.37 | Comparative material |
| 5 | 673 | 57.4 | 2.18 | Comparative material |
| 6 | 654 | 59.1 | 3.85 | Comparative material |
| 7 | 659 | 182.0 | 4.08 | Comparative material |
| 8 | 647 | 34.2 | 3.44 | Comparative material |
| 9 | 781 | 164.6 | 1.27 | Comparative material |
| 10 | 670 | 17.6 | 2.35 | Comparative material |
| 11 | 583 | 1.1 | 2.05 | Material of the invention |
| 12 | 577 | 5.2 | 2.15 | Material of the invention |
| 13 | 614 | 4.5 | 3.12 | Material of the invention |

As apparent from Table 18, both of the conventional material No. 1 and the comparative materials No. 2–No. 10 involve problems in view of the performance for the requirement of the corrosion resistance or wear resistance.

That is, although the conventional material No. 1, which is a Ni-based self fluxing alloy well-known as the wear resistant alloy, is satisfactory in the wear resistance. However, since Mo was not added because of the restriction in view of the production process, self-fluxing property, viscosity of the molten alloy, etc., the corrosion resistance was extremely poor.

The comparative materials No. 2–No. 10 are satisfactory in wear resistance, but the corrosion resistance is extremely poor since the amount of Cr is insufficient.

On the contrary, it can be seen that the materials No. 11–No. 13 according to the present invention have both excellent corrosion resistance and wear resistance. The balance is Co in the case of No. 11 and the balance is Ni in the case of No. 12 and No. 13. In any of the cases, the corrosion resistance is outstandingly superior to that of the conventional materials and the comparative materials and they also show abrasion resistance. It has also been confirmed that similar properties to those in No. 11–No. 13 can be obtained if Co is partially substituted with Ni or Ni is partially substituted with Co.

EXAMPLE 4

(Heat expansion coefficient)

For the alloys having chemical compositions (wt %) shown in Table 19, CrB was admixed to the powder of Ni-Mo-Si-Cu atomized alloy and applied with reaction sintering in HIP in the same manner as in Example 1 to produce alloys of the compositions shown in Table 19.

For the thus obtained specimens, hardness was measured and the corrosion resistance test was conducted in the same manner as in Example 1. In addition, the thermal expansion coefficient was also measured. The results are shown in Table 20.

From Table 20, it can be seen that all of the alloys No. 1–No. 3 according to the present invention show great heat expansion coefficient, indicating the value within a range from 12.0 to $14.5 \times 10^{-6}$ (°C.$^{-1}$), and the corrosion resistance is also satisfactory, whereas the thermal expansion coefficient is excessively increased in the comparative alloy No. 5. The hardness tends to be reduced along with the increase in the addition amount of Cu.

TABLE 19

| No. | Chemical compositions of Alloy (wt %) | | | | | | Remarks |
| --- | --- | --- | --- | --- | --- | --- | --- |
| | Cr | Mo | B | Si | Cu | Ni | |
| 1 | 17.5 | 24.0 | 3.6 | 2.9 | 1.0 | Bal | Alloy of the invention |
| 2 | " | " | " | " | 5.0 | " | Alloy of the invention |
| 3 | " | " | " | " | 10.0 | " | Alloy of the invention |
| 4 | " | " | " | " | 18.0 | " | Alloy of the invention |
| 5 | " | " | " | " | 22.0 | " | Comparative alloy |

TABLE 20

| No. | Characteristics of alloy | | | Remarks |
| --- | --- | --- | --- | --- |
| | Thermal expansion coefficient × $10^{-6}$ (°C.$^{-1}$) | Corrosion resistance Weight loss (HF) (mg) | Hardness (mHv) | |
| 1 | 12.0 | 15.5 | 786 | Alloy of the invention |
| 2 | 12.6 | 14.8 | 742 | Alloy of the invention |
| 3 | 13.3 | 14.7 | 714 | Alloy of the invention |
| 4 | 14.3 | 14.7 | 685 | Alloy of the invention |
| 5 | 14.7 | 15.1 | 653 | Comparative alloy |

Note: Thermal expansion coefficient is a value between 25–600° C.

Then, when a two-shaft cylinder for use in an injection molding machine as shown in FIG. 2 was produced by using the alloy according to the present invention as the lining alloy, the fabrication was possible even if the heat expansion coefficient was $12.0\times10^{-6}$ (°C.$^{-1}$) for the product with the inner diameter up to 60 mm$\phi$. In the drawing, are shown cylinder 1 made of mechanical structure steels (SCM 440), lining 2 of the alloy according to the present invention, flange 3, water cooling holes 4a, 4b, 5a, 5b for clamping bolts. In an actual molding machine, such a cylinder is clamped in series by a number of from 6 to 10 to constitute a long shaft cylinder. In a large-sized cylinder with the inner diameter of greater than 60 mm$\phi$, if the heat expansion coefficient of the lining alloy was less than $12.0\times10^{-6}$ (°C.$^{-1}$), there occurred a problem that the cracking was formed during cooling step of electric discharge fabrication to the inner surface by the residual stresses due to the difference of the heat expansion coefficient between the lining and the mother material. Even if the design for the mother material was made such that the occurrence of cracking could be suppressed up to the sintering step to of a cylindrical shape, cracks occurred upon fabrication of a hopper hole for the starting material insertion port by an end mill. Accordingly, in the case of producing a large sized cylinder with an inner diameter of greater than 60 mm$\phi$, it has been confirmed that an alloy having a heat expansion coefficient from 12.0 to $14.5\times10^{-6}$ (°C.$^{-1}$) is necessary as the lining material, for which the alloy according to the present invention is suitable.

What is claimed is:

1. Wear resistant powder sintered alloy of excellent corrosion resistance comprising a hard alloy containing from 15 to 95% of a hard phase composed of a M$_3$B$_2$ phase (M represents Ni or Co, Cr, Mo or W) structure in the matrix, wherein said hard alloy consists essentially of, on a weight basis, 0.5–9.0% of B, 14.0–35.0% of Cr, 14.0–50.0% of one or more of Mo and W, up to 3.5% of Si, 0.5–20.0% of one or more of Cu, Ag, Au and Pt and the balance of one or more of Ni and Co and inevitable impurities, and the matrix has a noble corrosion potential.

2. An alloy as defined in claim 1, wherein the corrosion potential of the matrix is higher than −400 mV.

3. Wear resistant powder sintered alloy of excellent corrosion resistance to halogen comprising a hard alloy containing from 15 to 95% of a hard phase composed of a M$_3$B$_2$ phase (M represents Ni or Co, Cr, Mo or W) structure in the matrix, wherein said hard alloy consists essentially of, on a weight basis, up to 3.5% of Si, 0.5–6.0% of B, 14.0–24% of Cr, 14.0–35% of Mo, 0.4–4.0 of Cu and the balance of Ni.

4. Wear resistant powder sintered alloy of excellent corrosion resistance to SO$_2$ comprising a hard alloy containing from 15 to 95% of a hard phase composed of a M$_3$B$_2$ phase (M represents Ni or Co, Cr, Mo or W) structure in the matrix, wherein said hard alloy consists essentially of, on a weight basis, 1.0–3.5% of Si, 0.5–6.0% of B, 14.0–24% of Cr, 14.0–35% of Mo, 7–65% of Ni, 0.4–4.0 of Cu, and the substantial balance of Co.

5. Wear resistant powder sintered alloy of excellent corrosion resistance to NOx comprising a hard alloy containing from 15 to 95% of a hard phase composed of a M$_3$B$_2$ phase (M represents Ni or Co, Cr, Mo or W) structure in the matrix, wherein said hard alloy consists essentially of, on a weight basis, 1.0–3.5% of Si, 0.5–6.0% of B, 24–30% of Cr, 14.0–35% of Mo, 0.4–4.0 of Cu, and the substantial balance of at least one of Ni and Co.

6. A composite material prepared by sintering and lining a hard powder alloy to the surface of steels, said hard alloy containing from 15 to 95% of a hard phase composed of a M$_3$B$_2$ phase (M represents Ni or Co, Cr, Mo or W) structure of less than 5 um grain size in the matrix, wherein said alloy consists essentially of, on a weight basis, 0.5–6.0% of B, 14.0–30.0% of Cr, 14.0–35.0% of Mo alone or in combination with W, up to 3.5% of Si, up to 5.0% of Fe and 0.5–4.0% of one or more of Cu, Ag, Au and Pt and the balance of one or more of Ni and Co and inevitable impurities.

7. A composite material as defined in claim 6 in the form of a cylinder or a screw of molding machines for plastics or ceramics.

8. A composite material prepared by sintering and lining a hard alloy to the surface of steels, said hard alloy containing from 15 to 95% of a hard phase composed of a M$_3$B$_2$ phase (M represents Ni or Co, Cr, Mo or W) structure of less than 5 um grain size in the matrix, wherein said alloy consists essentially of, on a weight basis, 0.5–6.0% of B, 14.0–30.0% of Cr, 14.0–35.0% of Mo alone or in combination with W, up to 3.5% of Si, up to 5.0% of Fe and 40–20.0% of one or more of Cu, Ag, Au and Pt and the balance of one or more of Ni and Co and inevitable impurities.

9. A composite material as defined in claim 8 in the form of a cylinder or a screw of molding machines for plastics or ceramics.

* * * * *